(12) United States Patent
Kim et al.

(10) Patent No.: US 10,025,398 B2
(45) Date of Patent: Jul. 17, 2018

(54) POSITION MEASUREMENT DEVICE FOR MEASURING POSITION OF PEN AND METHOD FOR CONTROLLING SAME

(71) Applicant: Samsung Electronics Co., Ltd., Gyeonggi-do (KR)

(72) Inventors: Byung-Jik Kim, Gyeonggi-do (KR); Sung-Soo Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 60 days.

(21) Appl. No.: 14/435,031

(22) PCT Filed: Oct. 8, 2013

(86) PCT No.: PCT/KR2013/008986
§ 371 (c)(1),
(2) Date: Apr. 10, 2015

(87) PCT Pub. No.: WO2014/058209
PCT Pub. Date: Apr. 17, 2014

(65) Prior Publication Data
US 2015/0261326 A1 Sep. 17, 2015

(30) Foreign Application Priority Data
Oct. 10, 2012 (KR) .................... 10-2012-0112551

(51) Int. Cl.
*G06F 3/041* (2006.01)
*G09G 5/00* (2006.01)
(Continued)

(52) U.S. Cl.
CPC .......... *G06F 3/03545* (2013.01); *G06F 3/046* (2013.01); *G06F 3/0416* (2013.01)

(58) Field of Classification Search
CPC ..... G06F 3/03545; G06F 3/0416; G06F 3/046
(Continued)

(56) References Cited

U.S. PATENT DOCUMENTS

| 5,661,269 | A | * | 8/1997 | Fukuzaki | G06F 3/046 178/19.06 |
| 2006/0087422 | A1 | * | 4/2006 | Oda | G06F 3/046 340/524 |

(Continued)

FOREIGN PATENT DOCUMENTS

| DE | 20 2012 102 976 | 9/2012 |
| EP | 2 372 511 | 10/2011 |

(Continued)

OTHER PUBLICATIONS

PCT/ISA/210 Search Report dated PCT/KR2013/008986 (pp. 3).
European Search Report dated May 31, 2016 issued in counterpart application No. 13845984.7—1972, 4 pages.

*Primary Examiner* — Amit Chatly
(74) *Attorney, Agent, or Firm* — The Farrell Law Firm, P.C.

(57) ABSTRACT

A position measurement device for measuring a position of a pen is provided. The position measurement device includes a first sub-loop unit that includes at least one loop configured to apply an electrical current or measuring an electromagnetic field change; a second sub-loop unit having at least one loop configured to measure the electromagnetic field change; and a control unit configured to determine at least one loop of the first sub-loop unit as a transmission signal transmitting loop to thereby apply the electrical current to the transmission signal transmitting loop, and measure the position of the pen based on the electromagnetic field change measured by each of the at least one loop of the first sub-loop unit and each of the at least one loop of the second sub-loop unit.

18 Claims, 12 Drawing Sheets

(51) Int. Cl.
*G06F 3/0354* (2013.01)
*G06F 3/046* (2006.01)

(58) Field of Classification Search
USPC .................................................. 345/156–178
See application file for complete search history.

(56) References Cited

U.S. PATENT DOCUMENTS

| | | |
|---|---|---|
| 2008/0023232 A1 | 1/2008 | Morag et al. |
| 2010/0252335 A1* | 10/2010 | Orsley .................... G06F 3/044 178/18.03 |
| 2010/0328249 A1 | 12/2010 | Ningrat et al. |
| 2011/0234485 A1* | 9/2011 | Kitahara ............... G06F 3/0416 345/156 |
| 2013/0106760 A1 | 5/2013 | Pedersen et al. |

FOREIGN PATENT DOCUMENTS

| | | |
|---|---|---|
| EP | 2 469 383 | 6/2012 |
| KR | 10-2007-0097869 | 10/2007 |
| KR | 10-2009-0033659 | 4/2009 |
| KR | 10-2009-0122571 | 12/2009 |
| KR | 10-2013-0029606 | 3/2013 |

\* cited by examiner

POSITION MEASUREMENT DEVICE FOR MEASURING POSITION OF PEN AND METHOD FOR CONTROLLING SAME

PRIORITY

This application is a National Phase Entry of PCT International Application No. PCT/KR2013/008986, which was filed on Oct. 8, 2013, and claims priority to Korean Patent Application No. 10-2012-0112551, which was filed on Oct. 10, 2012 in the Korean Intellectual Property Office, the contents of which are incorporated herein by reference.

BACKGROUND

1. Field of the Invention

The present invention relates generally to a position measurement device for measuring the position of a pen and a method for controlling the same, and more particularly, to a position measurement device and a control method thereof, by which some loops are used as transmitting/receiving loops and other loops are used as receiving loops.

2. Description of the Related Art

Recently, due to the rapid growth of the market related to smart phones and touch screens, related research is in progress. In order to input instructions in relation to a smart phone or a touch screen, a user may put a body part or an Electromagnetic Induction (EI) pen onto a certain position of a display to thereby input an instruction or select an icon.

The contact of a user's body part may be implemented by a capacitive type touch screen. The touch screen of a capacitive type generally includes a condenser between a transparent electrode and a transparent electrode. When a user's body part comes into contact with a touch screen, the touch of the user's body part is sensed, based on the change in capacitance of the condenser.

In this case, it is difficult to make a precise input in the capacitive type touch screen, because the contact of the user's body part onto the touch screen requires a relatively wide contact area. In contrast, an EI type touch screen has an advantage in that the operation can be made in a small contact area.

In the EI type touch screen, a loop coil, which is disposed in a circuit board, is applied with a voltage to thereby generate an electromagnetic field, and the electromagnetic field is controlled to be transferred to an EI pen. In this case, the EI pen includes a condenser and a loop and emits an electromagnetic field having a predetermined frequency in response to the transferred electromagnetic field.

The electromagnetic field emitted by the EI pen is transferred to the loop coil of the circuit board, so the position of where the EI pen approaches the touch screen can be determined.

In the typical EI type touch screen, all loop coils of the circuit board are supplied with an electrical current for electromagnetic induction in order to apply the electromagnetic field to the EI pen. The supply of an electrical current to the entire loop coils results in an increase in power consumption. Particularly, power consumption in the case of portable batteries of mobile devices may severely inconvenience the user.

In addition, since high voltage capability devices for applying an electric current having a great intensity to all of the loop coils are necessary, there are problems of an increase in the mounting area and high cost.

SUMMARY

The present invention has been made to address the above-mentioned problems and disadvantages, and to provide at least the advantages described below. Accordingly, an aspect of the present invention provides a position measurement device and a control method thereof, by which some loops are used as transmitting/receiving loops and other loops are used as receiving loops.

In accordance with an aspect of the present invention, a position measurement device for measuring a position of a pen is provided. The position measurement device includes a first sub-loop unit that includes at least one loop configured to apply an electrical current or measuring an electromagnetic field change; a second sub-loop unit that includes at least one loop configured to measure the electromagnetic field change; and a control unit configured to determine at least one loop of the first sub-loop unit as a transmission signal transmitting loop to thereby apply the electrical current to the transmission signal transmitting loop, and measure the position of the pen based on the electromagnetic field change measured by each of the at least one loop of the first sub-loop unit and each of the at least one loop of the second sub-loop unit.

In accordance with another aspect of the present invention, a method of controlling a position measurement device including a first sub-loop unit having at least one loop for applying an electrical current and measuring electromagnetic field change and a second sub-loop unit having at least one loop for measuring electromagnetic field change includes determining at least one loop of the first sub-loop unit as a transmission signal transmitting loop; applying an electrical current to the determined transmission signal transmitting loop; and measuring the electromagnetic field change from the first sub-loop unit and the second sub-loop unit to thereby determine a position of a pen.

In accordance with another aspect of the present invention, a position measurement device for measuring the position of a coordinate indicating object including an electromagnetic resonance circuit is provided. The position measurement device includes a first sub-loop unit and a second sub-loop unit of which loops are disposed to be perpendicular to each other; and a control unit configured to determine at least one loop in either the first sub-loop unit or the second sub-loop unit as a transmission signal transmitting loop to be thereby applied with an electrical signal, and measure resonance signals of the coordinate indicating object by the applied electrical signal from the first sub-loop unit and the second sub-loop unit to thereby determine a position of the coordinate indicating object.

BRIEF DESCRIPTION OF THE DRAWINGS

The above and other aspects, features, and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
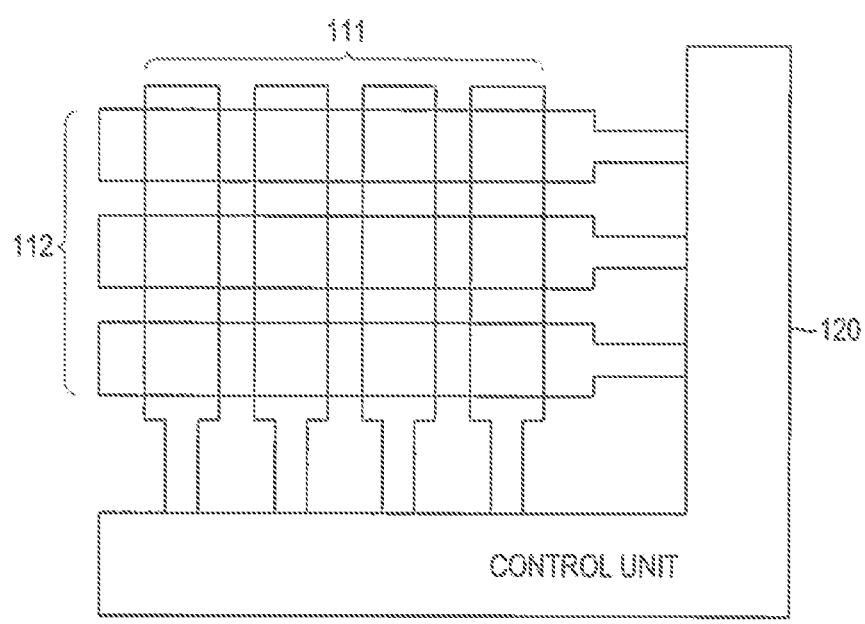
FIG. 1 is a diagram of a position measurement device according to an embodiment of the present invention.

Hereinafter, embodiments of the present invention are described in detail with reference to the accompanying drawings. It should be noted that the same reference numerals denote the same elements throughout the drawings. Descriptions of well-known functions and elements liable to obscure the present invention are omitted.

FIG. 1 is a diagram of a position measurement device according to an embodiment of the present invention.

The position measurement device includes a first sub-loop unit 111, a second sub-loop unit 112, and a control unit 120. The entire loops including the first and the second sub-loop units 111 and 112 may be referred to as a loop unit. In this case, the position measurement device may be a smart phone or a tablet Personal Computer (PC). Alternatively, the position measurement device may be a position measurement module included in a smart phone or a tablet PC. It is obvious to those skilled in the art that any device for measuring a position of a coordinate indicating device, such as a pen, can be a position measurement device.

As shown in FIG. 1, the first sub-loop unit 111 and the second sub-loop unit 112 are disposed to be perpendicular to each other. Although a plurality of loops included in the first sub-loop unit 111 or the second sub-loop unit 112 is illustrated to be spaced apart from each other, this is just for making a distinction between them. Thus, the plurality of loops may be disposed to overlap each other for a more accurate coordinate position measurement of a pen.

The first sub-loop unit 111 extends lengthwise along the y-axis rather than the x-axis, to be thereby used for sensing a coordinate of the x-axis. The second sub-loop unit 112 extends laterally along the x-axis rather than the y-axis, to be thereby used for sensing a coordinate of the y-axis.

Although the first sub-loop unit 111 and the second sub-loop unit 112 are described to be a group comprised of the loops perpendicular to each other, it is merely an example. Alternatively, the loops included in the position measurement device may be divided into the first sub-loop unit 111 and the second sub-loop unit 112 in various ways.

In this case, the first sub-loop unit 111 transmits a transmission signal (hereinafter, TX signal) to a pen and receives a reception signal (hereinafter, RX signal) from the pen. Further, the second sub-loop unit 112 receives the RX signal from the pen. That is, the first sub-loop unit 111 includes transmitting/receiving loops, and the second sub-loop unit 112 includes receiving loops. In this case, the reception of the RX signal by the second sub-loop unit 112 is the operation of measuring an electromagnetic field change received from the pen. When the RX signal is received from the pen, the second sub-loop unit 112 measures the electromagnetic field change.

The first sub-loop unit 111 receives an electrical current from the control unit 120 and applies the same to one of the loops during a preset first period. For example, the control unit 120 controls one switch, which is connected to one loop of the first sub-loop unit 111, to be turned on, and the other switches, which are connected to the other loops, to be turned off.

One loop of the first sub-loop unit 111 includes an electromagnetic field and emits the same, based on the applied current. In this case, the preset period may be changed. Although the control unit 120 directly provides a current to the first sub-loop unit 111 in an embodiment of the present invention, the control unit 120 controls an additional power supplying means to supply a current to the first sub-loop unit 111. One loop that induces the electromagnetic field of the first sub-loop unit 111 and emits the same may be referred to as a transmission signal transmitting loop (hereinafter, TX transmitting loop). In this case, the control unit 120 determines two or more transmitting loops as the TX transmitting loops.

The pen around the loop receives the electromagnetic field induced from one loop of the first sub-loop unit 111 and emits the same. In this case, the pen is described only as an example, and any means that is able to receive and emit an electromagnetic field may be adopted in the present invention.

Meanwhile, the loops of the second sub-loop unit 112 are controlled to sense the electromagnetic field change of the loops. The loops of the second sub-loop unit 112 sense the electromagnetic field change emitted from the pen. Since the pen is able to emit the electromagnetic field transferred from the first sub-loop unit 111, the electromagnetic field from the pen comes with a change therein so the second sub-loop unit 112 senses such a change in the electromagnetic field. The second sub-loop unit 112 senses the electromagnetic field change and determines a y-coordinate of the EI pen, based on the intensity of the greatest sensed signal that is sensed by the greatest signal loop and the intensities of signals from the loops adjacent to the greatest signal loop.

The second sub-loop unit 112 outputs the sensed signals that are sensed by the other loops as well as the signal of the greatest signal loop to the control unit 120, and the control unit 120 determines the peak point based on the output result of the sensed signals from the plurality of loops, to thereby determine the y-coordinate of the pen more precisely.

As set forth above, the control unit 120 controls to apply an electrical current to one loop of the first sub-loop unit 111 and controls the second sub-loop unit 112 to sense the electromagnetic field change. That is, the control unit 120 uses the second sub-loop unit 112 as a sensing loop.

After the first period expires, the control unit 120 controls to apply an electrical current to one loop of the first sub-loop unit 111 and controls the whole first sub-loop unit 111 to sense the electromagnetic field change.

The pen receives an electromagnetic field from one loop of the first sub-loop unit 111 and emits the same.

Each loop of the first sub-loop unit 111 senses the electromagnetic field change emitted from the pen and determines the x-coordinate of the pen based on the intensity of the greatest sensed signal detected by the greatest signal loop and the intensities of signals from the loops adjacent to the greatest signal loop.

The first sub-loop unit 111 outputs the sensed signals that are sensed by the other loops as well as the signal of the greatest signal loop to the control unit 120, and the control unit 120 determines the peak point based on the output result of the sensed signals, to thereby determine the x-coordinate of the pen.

As set forth above, for the second period, the control unit 120 controls to apply an electrical current to one loop of the first sub-loop unit 111 and controls the first sub-loop unit 111 to sense the electromagnetic field change. Afterward, the control unit 120 repeats the same operation as that of the first period.

Alternatively, the control unit 120 changes the TX transmitting loop, which applies an electrical current, to another loop of the first sub-loop unit 111. For example, the control unit 120 determines the loop that is closest to the determined x-coordinate of the pen as the TX transmitting loop.

The control unit 120 applies an electrical current to the changed TX transmitting loop, and the TX transmitting loop transmits the TX signal. The pen receives the TX signal from the loop around the pen. Accordingly, the pen receives the TX signal having a relatively great intensity.

As set forth above, the first sub-loop unit 111 transmits the TX signal or receives the RX signal. Further, the second sub-loop unit 112 does not transmit the TX signal but receives the RX signal. Accordingly, the second sub-loop unit 112 can adopt devices having a relatively low voltage capability. Furthermore, each loop of the first sub-loop unit 111 is connected to two switches for transmitting and receiving. In contrast, each loop of the second sub-loop unit 112 is connected to a single switch for receiving, so the total number of switches can decrease. In addition, unlike a device in which the entire loops are applied with an electrical current, a single loop is applied with an electrical current, which considerably reduces power consumption.

As described above, after the second period expires, the control unit 120 repeats the same operation as that of the first period. When the operation of the first period is repeated, the greatest signal loop, which has sensed the greatest sensed signal in the first sub-loop unit 111 for the second period, is determined as the TX transmitting loop to be thereby applied with an electrical current.

When the first sub-loop unit 111 or the second sub-loop unit 112 is controlled to sense an electromagnetic field change, the control unit 120 controls the loops of the first sub-loop unit 111 or the second sub-loop unit 112 to sense the electromagnetic field change by a group. For example, it is assumed that the first sub-loop unit 111 is controlled to sense the electromagnetic field change and the first sub-loop unit 111 includes 258 loops. In this case, the control unit 120 divides the loops of the first sub-loop unit 111 into six unit groups and controls each group to sense the electromagnetic field change. The electromagnetic field change is sensed by each loop. Thus, if it takes time "t" for one loop to sense the electromagnetic field change, it will take time "258t" for all of the loops to sense the electromagnetic field change. The control unit 120 according to the present invention is able to control to sense the electromagnetic field change by each unit group, for example, six groups, so the electromagnetic field change can be sensed in a short period of time, for example, in time "43t." In addition, the sensing of the electromagnetic field change may be performed several times since it takes a shorter period of time. Therefore, it may bring about the effect that a Signal to Noise Ratio (SNR) of the sensed signal increases.

Figure 2A:
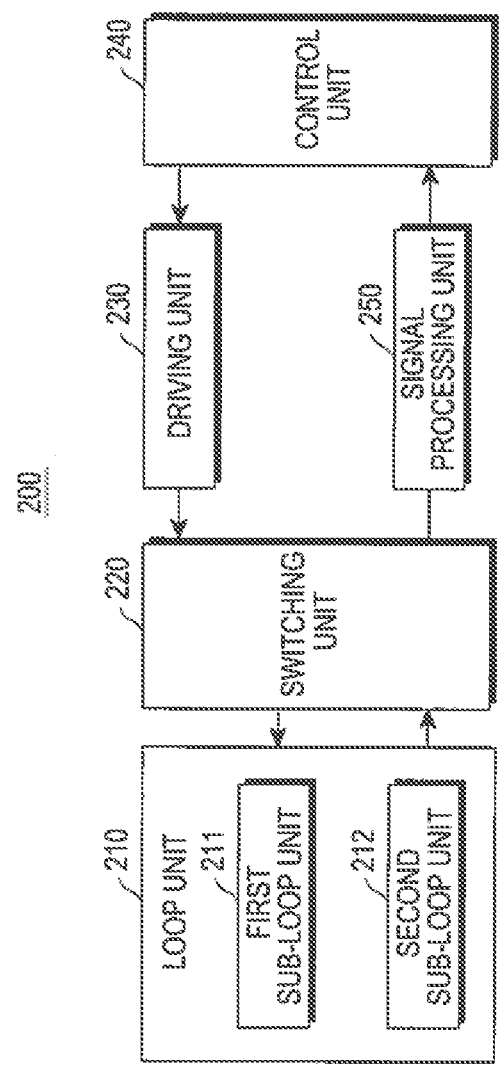
FIG. 2A is a block diagram of a position measurement device according to an embodiment of the present invention.

FIG. 2A is a block diagram of a position measurement device 200 according to an embodiment of the present invention.

As shown in FIG. 2, the position measurement device 200 includes a loop unit 210, a switching unit 220, a driving unit 230, a control unit 240 and a signal processing unit 250.

The loop unit 210 includes a first sub-loop unit 211 and a second sub-loop unit 212. Each of the first sub-loop unit 211 and the second sub-loop unit 212 include a plurality of loops, and the loops of the first sub-loop unit 211 and the second sub-loop unit 212 are disposed to be perpendicular to each other.

The switching unit 220 applies an electrical current from the driving unit 230 to one TX transmitting loop of the first sub-loop unit 211 under the control of the control unit 240.

The driving unit 230 generates and supplies an electrical current to the switching unit 220. It should be understood by those skilled in the art that any means for storing a predetermined amount of power and generating an electrical current having a preset intensity may be adopted as the driving unit 230.

The switching unit 220 connects the TX transmitting loop of the first sub-loop unit 211 with the driving unit 230 under the control of the control unit 240. Further, when the supply of an electrical current to the TX transmitting loop is finished, the switching unit 220 disconnects the TX transmitting loop from the driving unit 230. Then, the switching unit 220 connects each sensing loop with the control unit 240. For example, in the case in which the first sub-loop unit 211 is used as the sensing loop, the switching unit 220 connects each of the loops of the first sub-loop unit 211 with the control unit 240 one by one. Alternatively, in the case in which the second sub-loop unit 212 is used as the sensing loop, the switching unit 220 connects each of the loops of the second sub-loop unit 212 with the control unit 240 one by one. Alternatively, the switching unit 220 simultaneously senses a plurality of loops of the first sub-loop unit 211, which is described in detail below. The switching unit 220 connects the loops of the sub-loop unit that sense the electromagnetic field change with the signal processing unit 250 by each group.

The signal processing unit 250 processes the input sensed signals in the form of signals that can be processed by the control unit 240 and outputs the same to the control unit 240.

The sensed signals that have been processed by the signal processing unit 250 are output to the control unit 240, and the control unit 240 determines the coordinates of the pen, based on the sensed signals from each loop of the sub-loop unit that senses the electromagnetic field change in the loop unit 210. The control unit 240 may be implemented in the form of a micro-processor, an Integrated Circuit (IC), a Central Processing Unit (CPU) or a mini-computer.

Figure 2B:
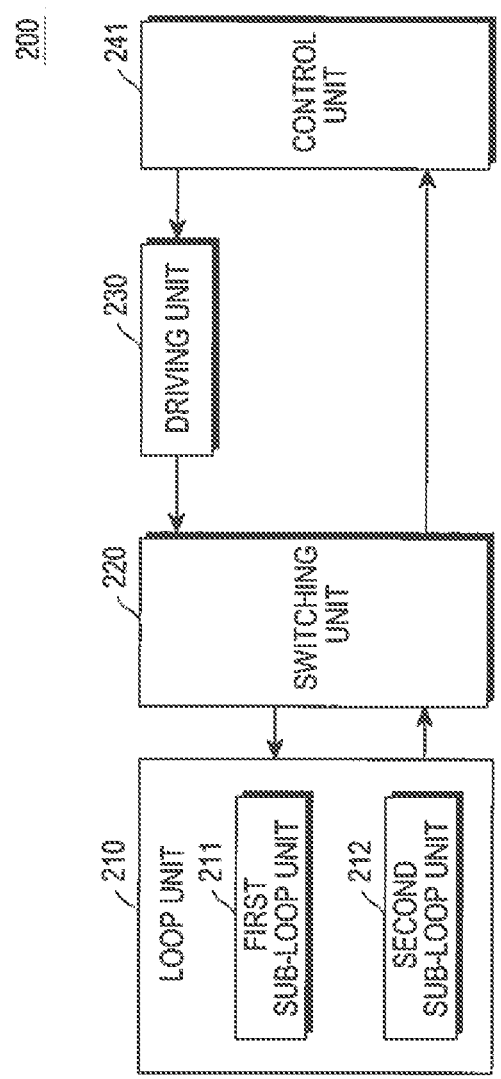
FIG. 2B is a block diagram of a position measurement device according to an embodiment of the present invention.

FIG. 2B is a block diagram of a position measurement device 200 according to an embodiment of the present invention. Unlike the position measurement device of FIG. 2A, the position measurement device 200 of FIG. 2B does not include the signal processing unit 250. The position measurement device 200 of FIG. 2A performs an analog signal analysis with respect to the sensed signals independently of the control unit 240, while the position measurement device of FIG. 2B performs the analog signal analysis in the control unit 241.

FIGS. 3A to 3D are diagrams illustrating a procedure of detecting a position of a pen according to an embodiment of the present invention. In the embodiment of the present invention shown in FIG. 3A, the position measurement device includes the first sub-loop unit and the second sub-loop unit. The first sub-loop unit includes loops X1, X2 and X3 for measuring the x-coordinate of the pen position. The second sub-loop unit includes loops Y1, Y2 and Y3 for measuring the y-coordinate of the pen position. In this case, the first sub-loop unit is used for TX signal transmission and RX signal reception, and the second sub-loop unit is used only for RX signal reception.

The position measurement device determines the loop X1 as the TX transmitting loop. For example, the control unit may randomly determine one of the loops of the first sub-loop unit as the TX transmitting loop. The control unit applies an electrical current to the TX transmitting loop X1. The TX transmitting loop X1 transmits the TX signal 301. The pen 1 receives the transmitted TX signal 301.

The pen 1 emits the RX signals 311, 312 and 313 in response to the received TX signal 301. The loop Y1 of the second sub-loop unit receives the RX signal 311, and the loop Y2 thereof receives the RX signal 312. Also, the loop Y3 of the second sub-loop unit receives the RX signal 313.

The control unit determines the y-coordinate of the position of the pen 1, based on the RX signals 311, 312 and 313 received by the loops Y1, Y2 and Y3, respectively.

Figure 3A:
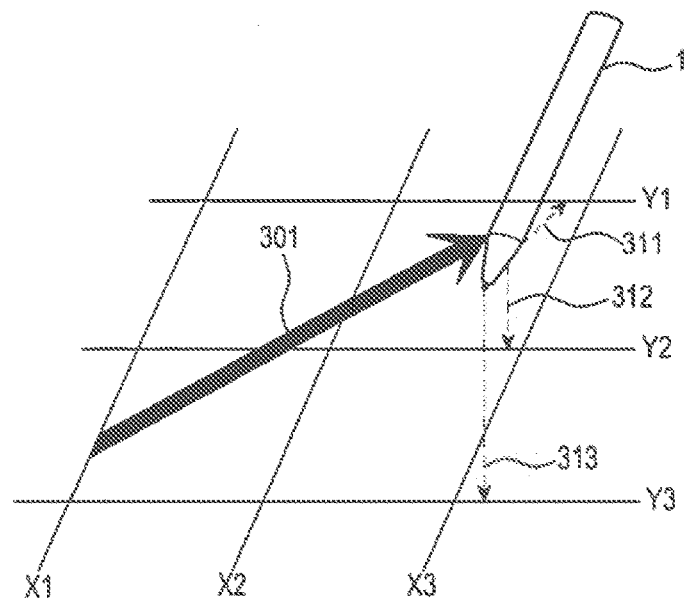
FIGS. 3A to 3D are diagrams illustrating a procedure of detecting a position of a pen according to an embodiment of the present invention.
Figure 4A:
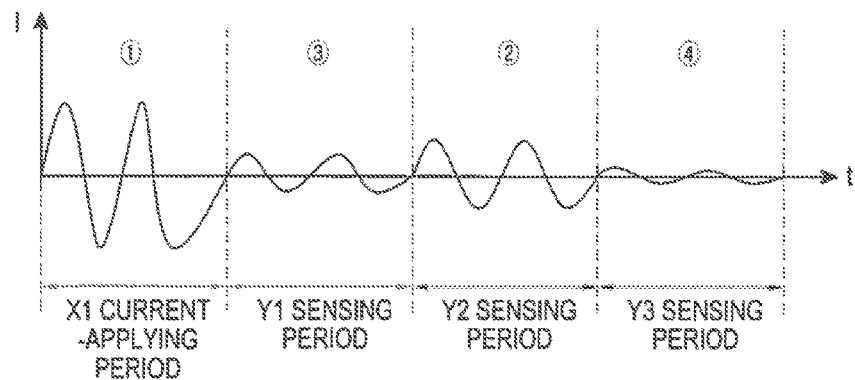
FIGS. 4A to 4D are graphs showing intensities of signals in the procedure of FIGS. 3A to 3D.

The graph of FIG. 4A shows a time sequence in the procedure of FIG. 3A. In FIG. 4A, the control unit applies an electrical current to the TX transmitting loop X1. For example, the control unit controls the switching unit to connect the TX transmitting loop X1 to the driving unit.

Then, the control unit receives the RX signals from the loops Y1, Y2 and Y3 one by one, and measures the intensities thereof. In FIG. 3A, the pen 1 is positioned relatively close to the loop Y2, so the intensity of the RX signal from the loop Y2 is greater than the intensity of the RX signals from the loops Y1 and Y3. In FIG. 4A, the numbers labeled in the upper portion of the graph denotes the degree of each signal in order of intensity. In FIG. 4A, the electrical current applied to the loop X1 has the greatest intensity. Then, the RX signals from the loops Y2 and Y1 have the second and the third greatest intensities, respectively, and the RX signal from the loop Y3 is the lowest in the intensity. Accordingly, the control unit determines the position of the pen 1 based on the RX signals from the loops. For example, the control unit determines that the y-coordinate of the position of the pen 1 is in proximity to the loop Y2.

Figure 3B:
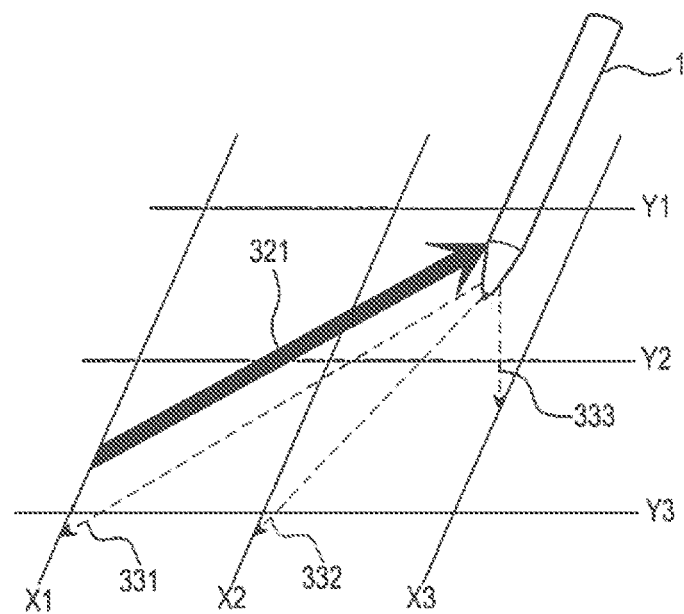

Then, as shown in FIG. 3B, the control unit applies an electrical current to the TX transmitting loop X1. The TX transmitting loop X1 transmits the TX signal 321. The pen 1 receives the transmitted TX signal 321.

In this case, the control unit changes the sensing loop for the first sub-loop unit rather than the second sub-loop unit and uses the same.

The pen 1 emits the RX signals 331, 332 and 333 in response to the received TX signal 321. The loop X1 of the first sub-loop unit receives the RX signal 331, and the loop X2 and the loop X3 receives the RX signal 332 and the RX signal 333, respectively. The control unit determines the x-coordinate of the position of the pen 1 based on the RX signals 331, 332 and 333 received by the loops X1, X2 and X3.

Figure 4B:
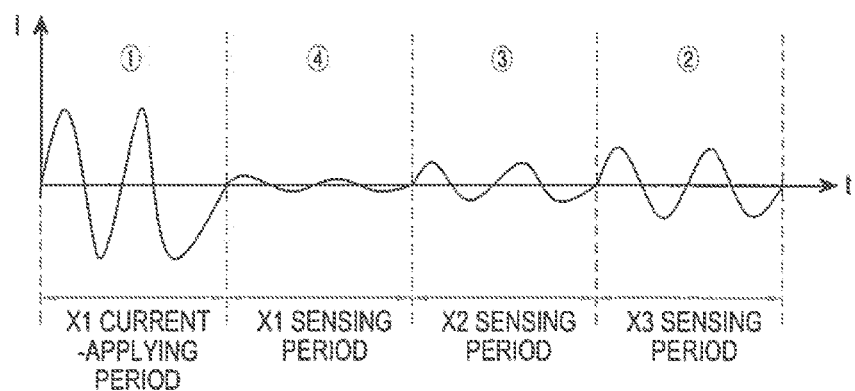

The time sequence of the procedure in FIG. 3B is shown in the graph of FIG. 4B. In FIG. 4B, the control unit applies an electrical current to the TX transmitting loop X1. For example, the control unit controls the switching unit to connect the TX transmitting loop X1 to the driving unit.

The TX transmitting loop X1 transmits the TX signal, based on the applied electrical current. Then, the control unit receives the RX signals from the loops X1, X2 and X3 in sequence and measures the same. In FIG. 3B, the pen 1 is positioned relatively close to the loop X3, so the intensity of the RX signal from the loop X3 is greater than the intensities of the RX signals from the loops X1 and X2. In FIG. 4B, the numbers labeled in the upper portion of the graph denotes the degree of each signal in order of intensity. In FIG. 4B, the electrical current applied to the loop X1 has the greatest intensity. Then, the RX signals from the loops X3 and X2 have the second and the third greatest intensities, respectively, and the RX signal from the loop X1 is lowest in intensity. Accordingly, the control unit determines the position of the pen 1 based on the RX signals from the loops. For example, the control unit determines that the x-coordinate of the position of the pen 1 is in proximity to the loop X3.

Figure 3C:
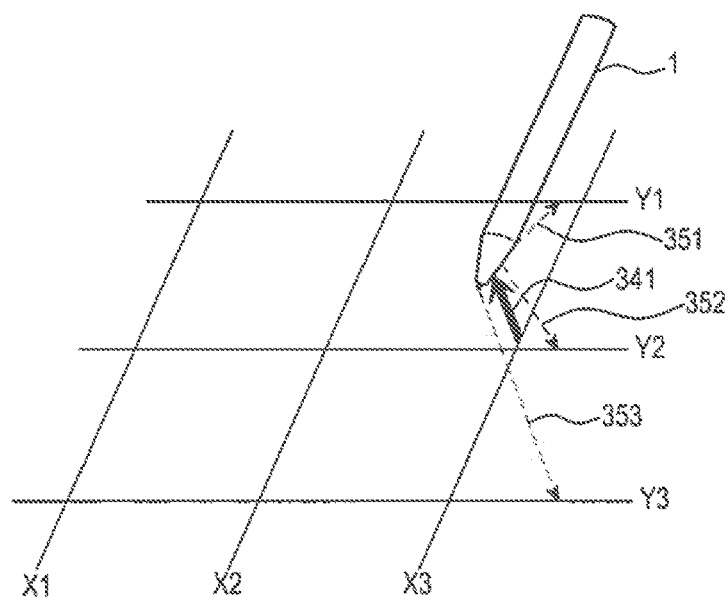

Then, as shown in FIG. 3C, the control unit changes the TX transmitting loop from the loop X1 to the loop X3. In the procedure of FIG. 3B, the control unit determines that the pen 1 is relatively close to the loop X3. Accordingly, the control unit changes the TX transmitting loop for the loop X3. This is intended to allow the pen 1 to receive the TX signal having a relatively greater intensity. Since the pen 1 is positioned closer to the loop X3 than the loop X1, it can receive the greater TX signal from the loop X3 than that from the loop X1.

The pen 1 emits the RX signals 351, 352 and 353 in response to the received TX signal 341. The loop Y1 of the second sub-loop unit receives the RX signal 351, and the loop Y2 and the loop Y3 receives the RX signal 352 and the RX signal 353, respectively.

The control unit determines the y-coordinate of the position of the pen 1 based on the RX signals 351, 352 and 353 received by the loops Y1, Y2 and Y3.

Figure 4C:
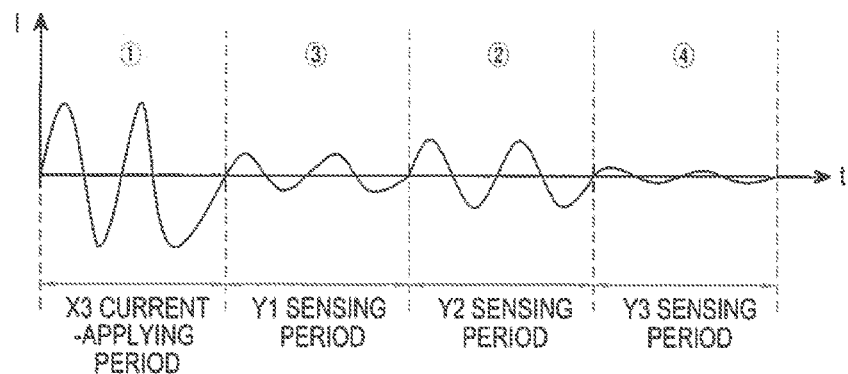

The time sequence of the procedure in FIG. 3C is shown in the graph of FIG. 4C. In FIG. 4C, the control unit applies an electrical current to the TX transmitting loop X3. For example, the control unit controls the switching unit to connect the TX transmitting loop X3 to the driving unit.

Then, the control unit receives the RX signals from the loops Y1, Y2 and Y3 one by one and measures the same. In FIG. 3C, the pen 1 is positioned relatively close to the loop Y2, so the intensity of the RX signal from the loop Y2 is greater than the intensity of the RX signals from the loops Y1 and Y3. In FIG. 4C, the numbers labeled in the upper portion of the graph denotes the degree of each signal in order of intensity. In FIG. 4C, the electrical current applied to the loop X3 has the greatest intensity. Then, the RX signals from the loops Y2 and Y1 have the second and the third greatest intensities, respectively, and the RX signal from the loop Y3 is the lowest in intensity. Accordingly, the control unit determines the position of the pen 1 based on the RX signals from the loops. For example, the control unit determines that the y-coordinate of the position of the pen 1 is in proximity to the loop Y2.

Figure 3D:
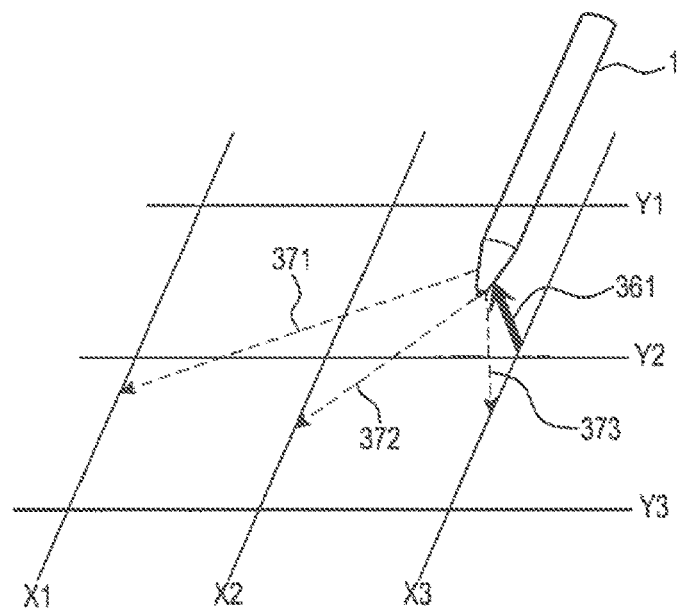

Then, as shown in FIG. 3D, the control unit applies an electrical current to the TX transmitting loop X3. The TX transmitting loop X3 transmits the TX signal 361. The pen 1 receives the transmitted TX signal 361.

In this case, the control unit changes the sensing loop for the first sub-loop unit rather than the second sub-loop unit and uses the same.

The pen 1 emits the RX signals 371, 372 and 373 in response to the received TX signal 361. The loop X1 of the first sub-loop unit receives the RX signal 371, and the loop X2 and the loop X3 receive the RX signal 372 and the RX signal 373, respectively. The control unit determines the x-coordinate of the position of the pen 1 based on the RX signals 371, 372 and 373 received by the loops X1, X2 and X3.

Figure 4D:
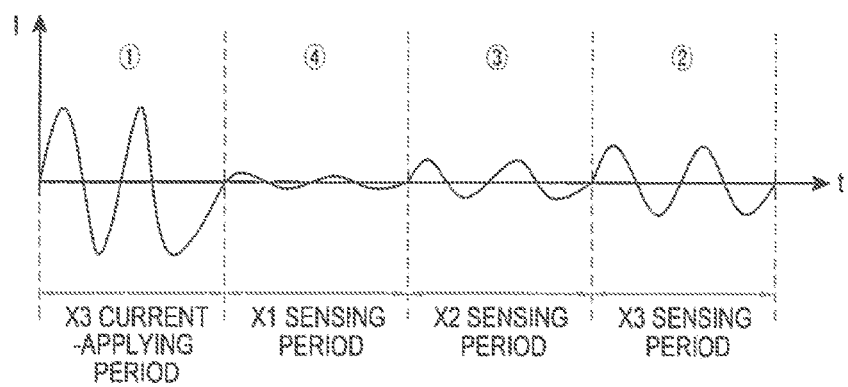

The time sequence of the procedure in FIG. 3D is shown in the graph of FIG. 4D. In FIG. 4D, the control unit applies an electrical current to the TX transmitting loop X3. For example, the control unit controls the switching unit to connect the TX transmitting loop X3 to the driving unit.

The TX transmitting loop X3 transmits the TX signal, based on the applied current. Then, the control unit receives the RX signals from the loops X1, X2 and X3 one by one and measures the same. In FIG. 3D, the pen 1 is positioned relatively close to the loop X3, so the intensity of the RX signal from the loop X3 is greater than the intensities of the RX signals from the loops X1 and X2. In FIG. 4D, the numbers labeled in the upper portion of the graph denotes the degree of each signal in order of intensity. In FIG. 4D, the electrical current applied to the loop X3 has the greatest intensity. Then, the RX signals from the loops X3 and X2 have the second and the third greatest intensities, respectively, and the RX signal from the loop X1 is the lowest in intensity. Accordingly, the control unit determines the position of the pen 1 based on the RX signals from the loops. For example, the control unit determines that the x-coordinate of the position of the pen 1 is in proximity to the loop X3.

As described above, the first sub-loop unit for determining the x-coordinate of the position of the pen 1 transmits the TX signal or receives the RX signal. In addition, the second sub-loop unit for determining the y-coordinate of the position of the pen 1 receives the RX signal. The control unit determines one of the loops of the first sub-loop unit as the TX transmitting loop to thereby transmit the TX signal. Then, the control unit determines the position of the pen 1 based on the RX signals received by the loops of the first and the second sub-loop units. In the embodiment of the present invention shown in FIGS. 3A to 3D, although the control unit measures the RX signal of each loop of the second sub-loop unit and then measures the RX signal of each loop of the first sub-loop unit, it is merely an example. Alternatively, the control unit controls to simultaneously measure the electromagnetic field change by each group of the loops instead of measuring the electromagnetic field change by each loop of the sub-loop unit. Alternatively, the control unit simultaneously measures the electromagnetic field change of the loops of the first sub-loop unit and the second sub-loop unit. These embodiments of the present invention are described in detail below.

Figure 5:
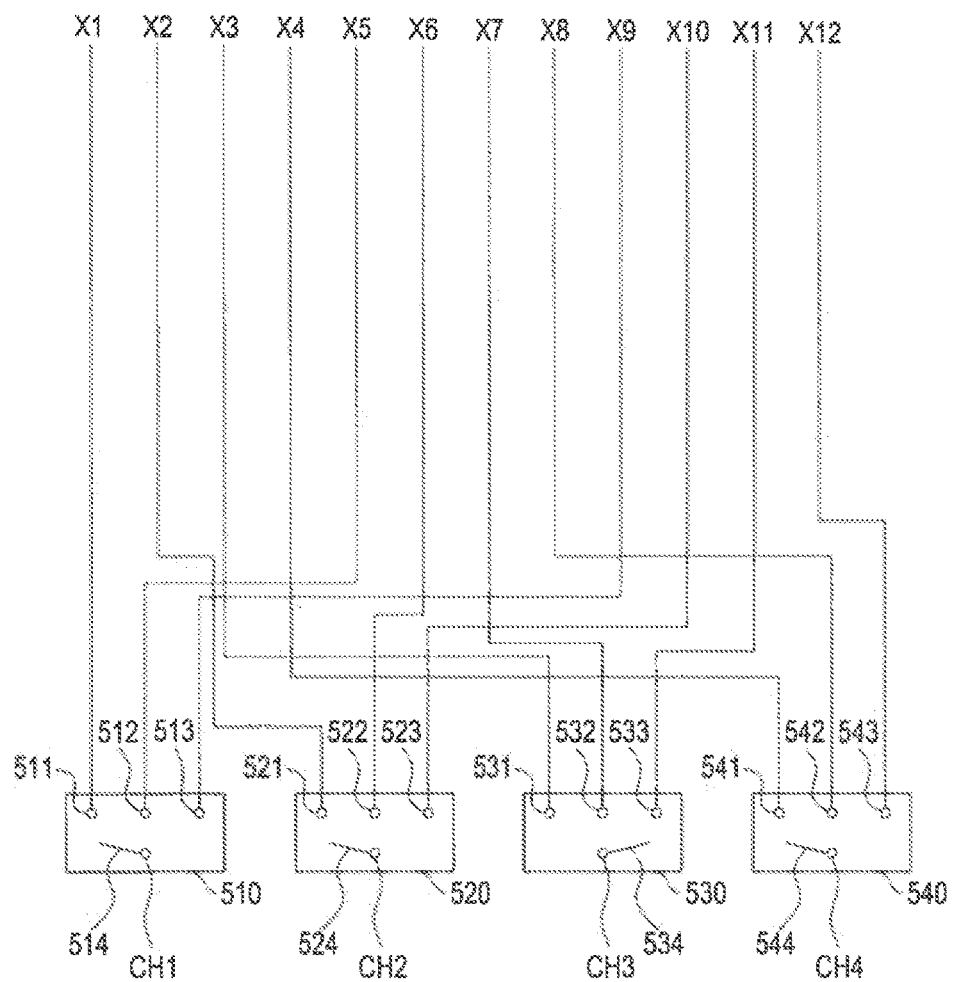
FIG. 5 is a diagram illustrating a measurement of an electromagnetic field change according to an embodiment of the present invention.

FIG. 5 is a diagram illustrating a measurement of an electromagnetic field change according to an embodiment of the present invention. FIG. 5 shows an embodiment of the present invention in which the control unit controls to simultaneously measure the electromagnetic field change by each group of the loops rather than measuring the electromagnetic field change by each of a plurality of loops of the sub-loop unit. For the convenience of explanation, FIG. 5 illustrates a configuration of loops required to determine the x-coordinate of a position of a pen.

As shown in FIG. 5, one end 511 of a loop X1, one end 512 of a loop X5 and one end 513 of a loop X9 are connected to the first channel 510. Each of the loops X1, X5 and X9 are connected or disconnected to or from the first channel 510 according to the connection status of a first switch 514. The other ends of the loops X1, X5 and X9 may be connected to a common terminal for a ground.

One end 521 of a loop X2, one end 522 of a loop X6 and one end 523 of a loop X10 are connected to a second channel 520. Each of the loops X2, X6 and X10 are connected or disconnected to or from the second channel 520 according to the connection status of the second switch 524. The other ends of the loops X2, X6 and X10 are connected to a common terminal for a ground.

One end 531 of a loop X3, one end 532 of a loop X7 and one end 533 of a loop X11 are connected to the third channel 530. Each of the loops X3, X7 and X11 are connected or disconnected to or from the third channel 530 according to the connection status of the third switch 534. The other ends of the loops X3, X7 and X11 are connected to a common terminal for a ground.

One end 541 of a loop X4, one end 542 of a loop X8 and one end 543 of a loop X12 are connected to the fourth channel 540. Each of the loops X4, X8 and X12 are connected or disconnected to or from the fourth channel 540 according to the connection status of the fourth switch 544. The other ends of the loops X4, X8 and X12 are connected to a common terminal for a ground.

The control unit simultaneously measures the RX signals input to the first channel, the second channel, the third channel and the fourth channel. For example, the control unit controls to connect the first switch 514 to one end 511 of the loop X1, the second switch 524 to one end 521 of the loop X2, the third switch 534 to one end 531 of the loop X3, and the fourth switch 544 to one end 541 of the loop X4, respectively. Accordingly, the control unit can shorten the time for measurement by four times as compared to the case in which the RX signals are measured one by one by each loop.

Then, the control unit controls to connect the first switch 514 to one end 512 of the loop X5, the second switch 524 to one end 522 of the loop X6, the third switch 534 to one end 532 of the loop X7, and the fourth switch 544 to one end 542 of the loop X8, respectively. Then, the control unit controls to connect the first switch 514 to one end 513 of the loop X9, the second switch 524 to one end 523 of the loop X10, the third switch 534 to one end 533 of the loop X1, and the fourth switch 544 to one end 543 of the loop X12, respectively.

As set forth above, the control unit simultaneously measures the RX signals input to the channels from the first to the fourth. That is, the control unit determines the unit measurement range by making the sub-loop unit into groups of a preset number of loops. For example, the control unit determines the loops X1 to X4 as the first group, the loops X5 to X8 as the second group, and the loops X9 to X12 as the third group, respectively. The control unit measures the intensities of the RX signals in the first group, i.e., the loops X1 to X4, by simultaneously measuring the first to the fourth channels.

The control unit changes the loops to be connected to the first to the fourth channels from the loops X1 to X4 to the loops X5 to X8. The control unit measures the intensities of the RX signals in the second group, i.e., the loops X5 to X8, by simultaneously measuring the first to the fourth channels. The control unit changes the loops to be connected to the first to the fourth channels from the loops X5 to X8 to the loops X9 to X12. The control unit measures the intensities of the RX signals in the third group, i.e., the loops X9 to X12, by simultaneously measuring the first to the fourth channels. As describe above, the control unit makes groups having a preset number of loops to determine the unit measurement range. The control unit measures the intensity of the RX signal by the determined unit measurement range, so the time taken for the measurement can be shortened.

Figure 6A:
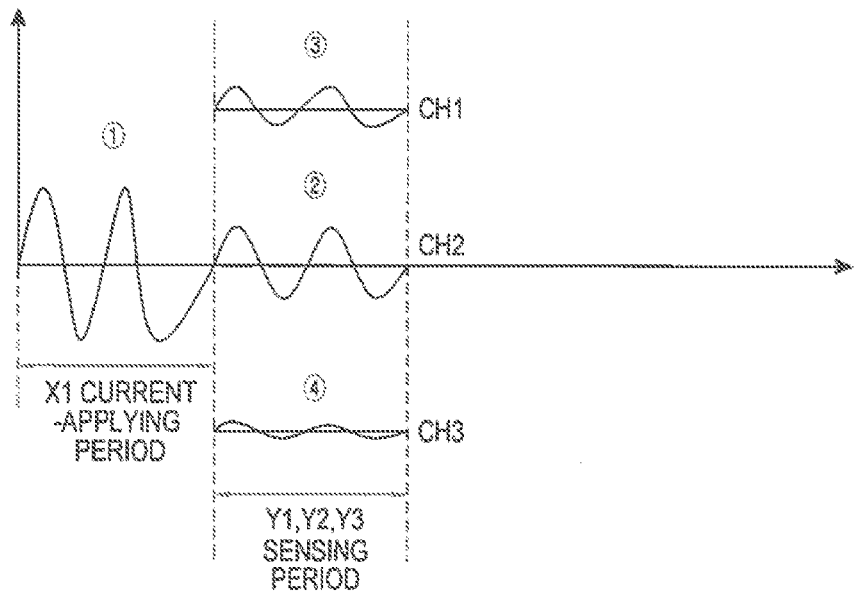
FIGS. 6A and 6B are graphs of signals that are applied or measured to or in each loop according to an embodiment of the present invention.
Figure 6B:
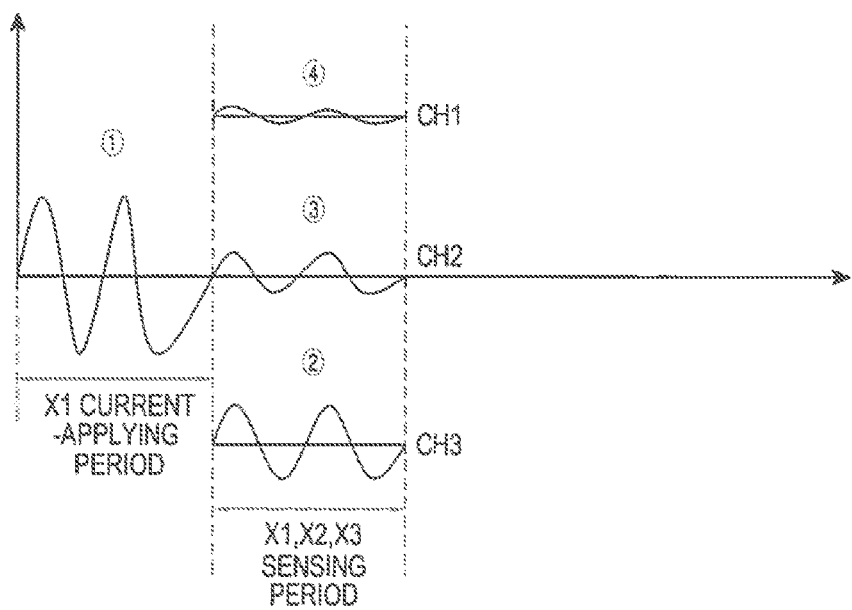

FIGS. 6A and 6B are graphs of signals that are applied or measured to or in each loop according to an embodiment of the present invention.

The control unit applies an electrical current to the TX transmitting loop X1. For example, the control unit controls the switching unit to connect the TX transmitting loop X1 to the driving unit.

Then, the control unit simultaneously measures the intensities of the RX signals corresponding to the first channel, the second channel and the third channel. For example, the control unit measures the intensity of the RX signal corresponding to the loop Y1 in the first channel, the intensity of the RX signal corresponding to the loop Y2 in the second channel, and the intensity of the RX signal corresponding to the loop Y3 in the third channel, respectively.

In FIG. 6A, the numbers labeled in the upper portion of the graph denotes the degree of each signal in order of intensity. In FIG. 6A, the electrical current applied to the loop X1 has the greatest intensity. Then, the RX signals from the loops Y2 and Y1 have the second and the third greatest intensities, respectively, and the RX signal from the loop Y3 is the lowest in intensity.

When the measurement is completed, the control unit connects the first channel, the second channel and the third channel with other loops. The control unit measures the intensities of the RX signals corresponding to other loops, and this will be repeated until the RX signals corresponding to the entire loops are measured.

The control unit determines the y-coordinate of the position of the pen 1 through the above-mentioned procedure.

After the y-coordinate of the position of the pen is determined, the control unit determines the x-coordinate of the position of the pen 1. The control unit simultaneously measures the intensities of the RX signals corresponding to the first channel, the second channel and the third channel. For example, the control unit measures the intensity of the RX signal corresponding to the loop X1 in the first channel, the intensity of the RX signal corresponding to the loop X2 in the second channel, and the intensity of the RX signal corresponding to the loop X3 in the third channel, respectively.

In FIG. 6B, the numbers labeled in the upper portion of the graph denotes the degree of each signal in order of intensity. In FIG. 6B, the electrical current applied to the loop X1 has the greatest intensity. Then, the RX signals from the loops X3 and X2 have the second and the third greatest intensities, respectively, and the RX signal from the loop X1 is the lowest in intensity.

When the measurement is completed, the control unit connects the first channel, the second channel and the third channel with other loops. The control unit measures the intensities of the RX signals corresponding to other loops, and this will be repeated until the RX signals corresponding to the entire loops are measured.

The control unit determines the x-coordinate of the position of the pen 1 through the above-mentioned procedure.

The control unit changes the TX transmitting loop according to the determined position of the pen 1. In addition, the control unit repeats the procedure set forth above by using the changed TX transmitting loop.

Figure 7:
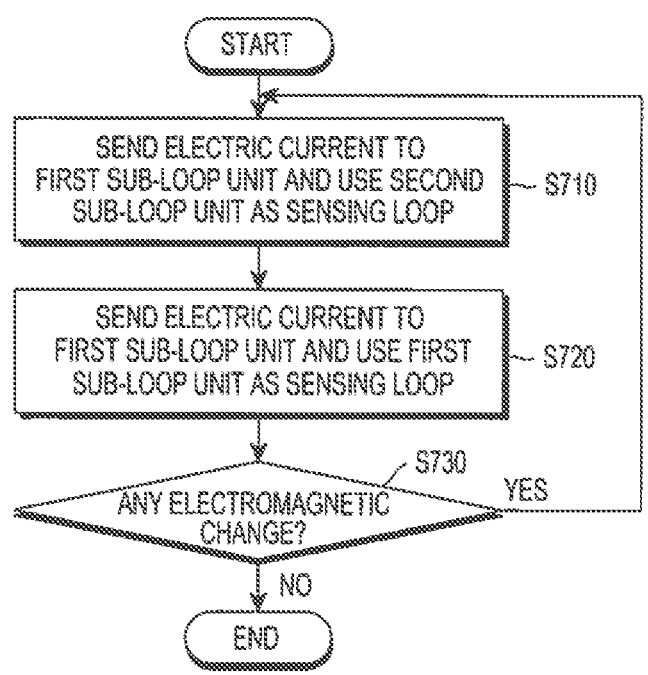
FIG. 7 is a flowchart illustrating a method of controlling a position measurement device for measuring the position of a pen according to an embodiment of the present invention.

FIG. 7 is a flowchart illustrating a method for controlling a position measurement device for measuring a position of a pen according to an embodiment of the present invention. The position measurement device according to the embodiment of the present invention shown in FIG. 7 includes the first sub-loop unit and the second sub-loop unit for measuring the position of the pen. The first sub-loop unit includes a plurality of loops for measuring the x-coordinate of the position of the pen. Furthermore, the second sub-loop unit includes a plurality of loops for measuring the y-coordinate of the position of the pen.

The position measurement device applies an electrical current to the first sub-loop unit to thereby transmit the TX signal in step S710. For example, the position measurement device determines one loop of the first sub-loop unit as the TX transmitting loop. The position measurement device applies an electrical current to the TX transmitting loop, and the TX transmitting loop transmits the TX signal based on the applied electrical current. The transmitted TX signal is received by the pen, and the pen transmits the RX signal to the position measurement device, based on the received TX signal.

The position measurement device controls the second sub-loop unit to receive the RX signal. The position measurement device determines the y-coordinate of the position of the pen based on the intensity of the RX signal input to each loop of the second sub-loop unit.

The position measurement device applies an electrical current to the first sub-loop unit to thereby transmit the TX signal in step S720. More specifically, the position measurement device applies an electrical current to the TX transmitting loop that has been determined in the operation in step S710, and the TX transmitting loop transmits the TX signal based on the applied electrical current. The transmitted TX signal is received by the pen, and the pen transmits the RX signal to the position measurement device, based on the received TX signal.

The position measurement device controls the first sub-loop unit to receive the RX signal. The position measurement device determines the x-coordinate of the position of the pen based on the intensity of the RX signal input to each loop of the first sub-loop unit.

The position measurement device repeats the above operation until the electromagnetic field change is not detected in step S730. Meanwhile, the operations mentioned above are merely an example, and the position measurement device may determine the TX transmitting loop in the second sub-loop unit.

Figure 8:
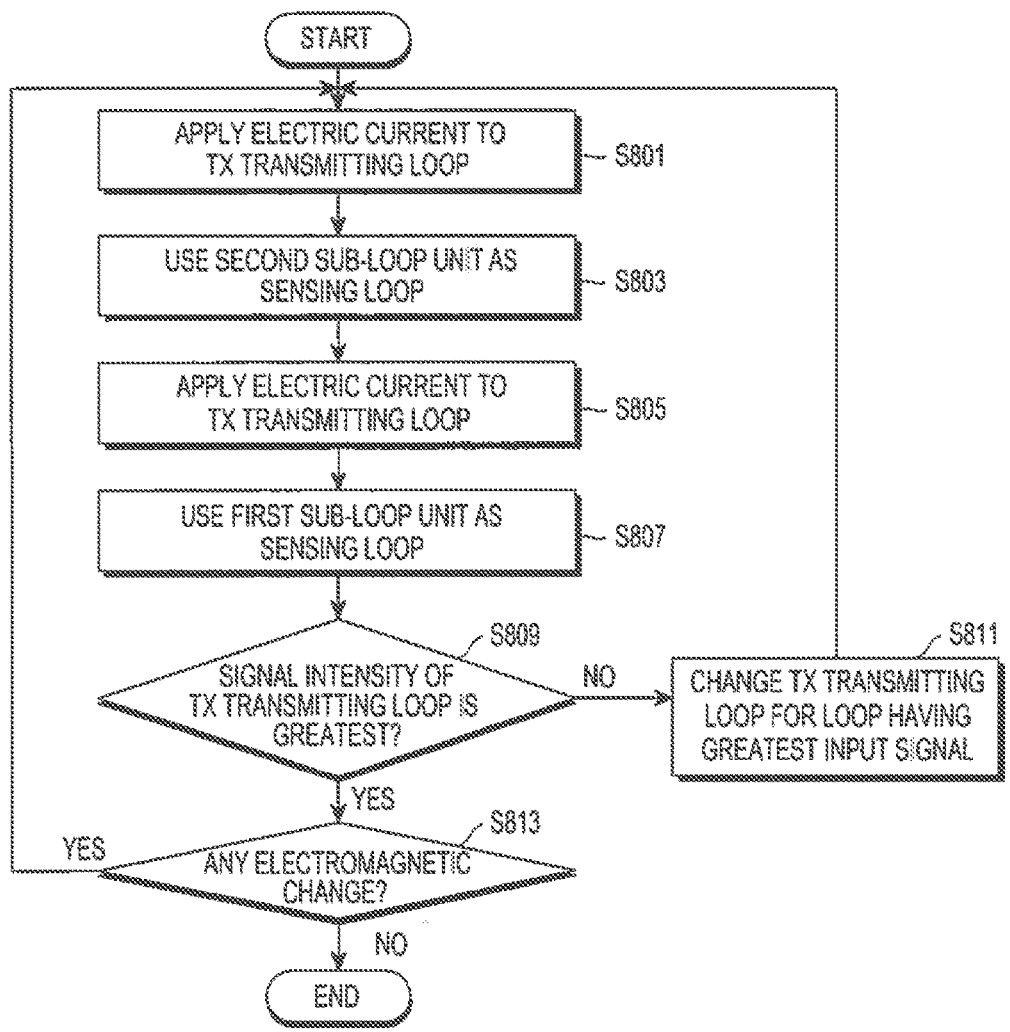
FIG. 8 is a flowchart illustrating a method for controlling a position measurement device according to an embodiment of the present invention.

FIG. 8 is a flowchart illustrating a method for controlling a position measurement device according to an embodiment of the present invention.

The position measurement device according to the embodiment of the present invention shown in FIG. 8 includes the first sub-loop unit and the second sub-loop unit for measuring the position of the pen. The first sub-loop unit includes a plurality of loops for measuring the x-coordinate of the position of the pen. Furthermore, the second sub-loop unit includes a plurality of loops for measuring the y-coordinate of the position of the pen.

The position measurement device determines one loop of the first sub-loop unit as the TX transmitting loop and applies an electrical current thereto in step S801. The TX transmitting loop transmits the TX signal based on the applied electrical current. The transmitted TX signal is received by the pen, and the pen transmits the RX signal to the position measurement device, based on the received TX signal.

The position measurement device controls the second sub-loop unit to receive the RX signal in step S803. The position measurement device determines the y-coordinate of the position of the pen based on the intensity of the RX signal input to each loop of the second sub-loop unit.

The position measurement device applies an electrical current to the TX transmitting loop that has been determined in the operation in step S801, and the TX transmitting loop transmits the TX signal based on the applied electrical current in step S805. The transmitted TX signal is received by the pen, and the pen transmits the RX signal to the position measurement device, based on the received TX signal.

The position measurement device controls the first sub-loop unit to receive the RX signal in step S807. The position measurement device determines the x-coordinate of the position of the pen based on the intensity of the RX signal input to each loop of the first sub-loop unit.

The position measurement device determines whether the RX signal of the TX transmitting loop has the greatest intensity in step S809. If the RX signal of the TX transmitting loop does not have the greatest intensity in step S809 (i.e., No), the position measurement device changes the TX transmitting loop for the loop having the greatest intensity of the RX signal in step S811. The position measurement device repeats the above operation until the electromagnetic field change is not detected in step S813.

Figure 9:
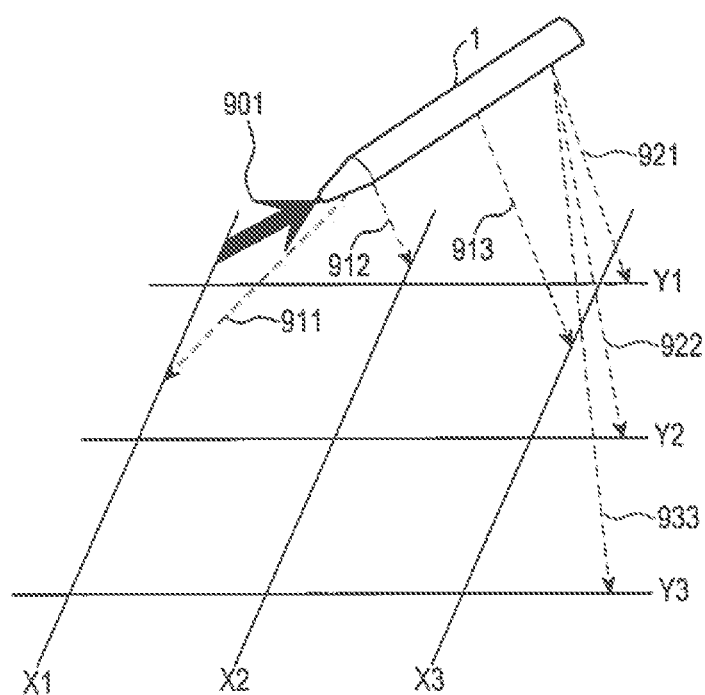
FIG. 9 is a diagram illustrating an operation of a position measurement device for measuring a position of a pen according to an embodiment of the present invention.

FIG. 9 is a diagram illustrating an operation of a position measurement device for measuring a position of a pen according to another embodiment of the present invention.

The position measurement device determines one loop X1 of the first sub-loop unit loops X1, X2 and X3 as the TX transmitting loop. The position measurement device applies an electrical current to the determined TX transmitting loop X1, and the TX transmitting loop X1 transmits the TX signal 901 to the pen in response thereto. The pen 1 transmits the RX signals 911, 912, 913, 921, 922 and 923 to the position measurement device in response to the input TX signal 901.

The position measurement device simultaneously measures the intensities of the RX signals corresponding to the loops X1, X2, X3, Y1, Y2 and Y3. The position measurement device determines the position of the pen in response to the intensity of the RX signal input to each loop.

The position measurement device re-determines or maintains the TX transmitting loop according to the determined position of the pen 1. The operation mentioned above may be repeated.

The invention claimed is:

1. A position measurement device for measuring a position of a pen, comprising:
    a first plurality of loops configured to receive an electrical current or obtain a signal emitted by the pen, wherein the first plurality of loops is arranged in a first direction and each loop of the first plurality of loops is connected to a first switch for transmitting a transmission signal based on the electrical current and a second switch for obtaining the signal emitted by the pen;
    a second plurality of loops configured to obtain the signal emitted by the pen, wherein the second plurality of loops is arranged in a second direction different from the first direction and each loop of the second plurality of loops is connected to a third switch for obtaining the signal emitted by the pen; and
    a control unit configured to:
        determine at least one loop of the first plurality of loops as a transmission signal transmitting loop,
        apply the electrical current to the transmission signal transmitting loop,
        determine the position of the pen based on the signal obtained by at least one loop among the first plurality of loops and the second plurality of loops, and
        change the transmission signal transmitting loop to another loop of the first plurality of loops, based on the determined position of the pen.

2. The position measurement device as claimed in claim 1, wherein the control unit is further configured to simultaneously measure the signal obtained through a first preset number of loops in the first plurality of loops or the second plurality of loops.

3. The position measurement device as claimed in claim 2, wherein the control unit is further configured to simultaneously measure the signal obtained through a second preset number of loops in the first plurality of loops or the second plurality of loops after measuring the signal obtained through the first preset number of loops in the first plurality of loops or the second plurality of loops.

4. The position measurement device as claimed in claim 1, wherein the control unit is further configured to simultaneously measure a signal from a first loop of the first plurality of loops and a signal from second loop of the second plurality of loops.

5. The position measurement device as claimed in claim 1, further comprising:
    a driving unit configured to supply the electrical current, wherein the first switch is configured to output the electrical current supplied from the driving unit to the transmission signal transmitting loop.

6. The position measurement device as claimed in claim 5, wherein at least one switch among the second switch and the third switch is further configured to connect the first plurality of loops or the second plurality of loops to the control unit after the transmission signal transmitting loop and the driving unit are connected.

7. The position measurement device as claimed in claim 1, wherein the control unit is further configured to change the transmission signal transmitting loop to a loop of the first plurality of loops, which is closest to the measured position of the pen.

8. The position measurement device as claimed in claim 1, further comprising a signal processing unit configured to process the signal.

9. The position measurement device as claimed in claim 1, wherein the control unit is further configured to simultaneously measure the signal obtained through the first plurality of loops and the second plurality of loops.

10. A method of controlling a position measurement device including a first plurality of loops being arranged in a first direction and a second plurality of loops being arranged in a second direction different from the first direction, the method comprising:
    determining at least one loop of the first plurality of loops as a transmission signal transmitting loop;
    applying an electrical current to the determined transmission signal transmitting loop;
    determining a position of a pen based on a signal emitted by the pen, obtained by at least one loop among the first plurality of loops and the second plurality of loops; and
    changing the transmission signal transmitting loop to another loop of the first plurality of loops, based on the determined position of the pen,
    wherein each loop of the first plurality of loops is connected to a first switch for transmitting a transmission signal based on the electrical current and a second switch for obtaining the signal emitted by the pen, and
    wherein each loop of the second plurality of loops is connected to a third switch for obtaining the signal emitted by the pen.

11. The method as claimed in claim 10, further comprising:
    simultaneously measuring a signal from a first loop of the first plurality of loops and a signal from a second loop of the second plurality of loops.

12. The method as claimed in claim 10, further comprising:

simultaneously measuring the signal obtained through a first preset number of loops in the first plurality of loops or the second plurality of loops.

13. The method as claimed in claim 12, further comprising:
simultaneously measuring the signal obtained through a second preset number of loops in the first plurality of loops or the second plurality of loops after measuring the signal obtained through the first preset number of loops in the first plurality of loops or the second plurality of loops.

14. The method as claimed in claim 10, further comprising:
simultaneously measuring the signal obtained through the first plurality of loops and the second plurality of loops.

15. The method as claimed in claim 10, wherein changing the transmission signal transmitting loop to another loop of the plurality of loops comprises determining the transmission signal transmitting loop as a loop of the first plurality of loops which is closest to the determined position of the pen.

16. A position measurement device for measuring a position of a coordinate indicating object including an electromagnetic resonance circuit, comprising:
a first plurality of loops and a second plurality of loops of which loops are disposed to be perpendicular to each other; and
a control unit configured to:
determine at least one loop of the first plurality of loops as a transmission signal transmitting loop,
apply an electrical signal to the transmission signal transmitting loop,
measure resonance signals of the coordinate indicating object through at least one loop among the first plurality of loops and the second plurality of loops,
determine the position of the coordinate indicating object based on the measurement result, and
change the transmission signal transmitting loop to another loop of the first plurality of loops, based on the determined position of the coordinate indicating object,
wherein each loop of the first plurality of loops is connected to a first switch for transmitting a transmission signal based on the electrical signal and a second switch for obtaining the signal of the coordinate indicating object, and
wherein each loop of the second plurality of loops is connected to a third switch for obtaining the signal of the coordinate indicating object.

17. The position measurement device as claimed in claim 16, wherein the control unit is further configured to simultaneously measure the resonance signals from at least two loops each in the first plurality of loops and the second plurality of loops.

18. The position measurement device as claimed in claim 16, wherein the control unit is further configured to measure a first resonance signal through the first plurality of loops during a first time period and measure a second resonance signal through the second plurality of loops during a second time period.

* * * * *